United States Patent [19]

Yamashita

[11] Patent Number: 4,471,701
[45] Date of Patent: Sep. 18, 1984

[54] CONNECTING MECHANISM OF AN XY TABLE

[75] Inventor: Kenkichi Yamashita, Fujisawa, Japan

[73] Assignee: Nippon Seiko K.K., Tokyo, Japan

[21] Appl. No.: 416,616

[22] Filed: Sep. 10, 1982

[30] Foreign Application Priority Data

Sep. 16, 1981 [JP] Japan .............. 56-136385[U]

[51] Int. Cl.³ .............................................. A47B 11/00
[52] U.S. Cl. ...................... 108/137; 33/1 M; 104/119; 108/20; 308/3 A
[58] Field of Search ............... 108/20, 137; 104/118, 104/119; 308/189 A, 3 A, 3 B, 3.9; 248/125, 429, 430; 74/479; 33/1 M

[56] References Cited

U.S. PATENT DOCUMENTS

| | | | |
|---|---|---|---|
| 1,377,123 | 5/1921 | Gnagy | 308/189 A |
| 1,457,184 | 5/1923 | Munson | 308/189 A |
| 3,124,018 | 9/1964 | Gough | 77/63 |
| 3,244,393 | 5/1966 | Wallerstein, Jr. | 248/430 X |
| 3,437,053 | 4/1969 | Bush et al. | 104/119 |
| 3,561,125 | 2/1971 | Zeidler | 33/1 M |
| 3,897,119 | 7/1975 | McMurtie | 308/3 A |
| 3,909,085 | 9/1975 | Wikinson | 308/189 A |
| 4,042,119 | 8/1977 | Hassan | 214/1 CM |
| 4,161,342 | 7/1979 | Nelson | 308/3 A |
| 4,184,723 | 1/1980 | Danielsson | 308/189 A |
| 4,193,317 | 3/1980 | Oono | 108/137 X |
| 4,262,974 | 4/1981 | Tojo | 308/3 A |
| 4,334,717 | 6/1982 | Polidor | 308/3 A |
| 4,409,860 | 10/1983 | Moriyama et al. | 74/479 |

Primary Examiner—James T. McCall
Attorney, Agent, or Firm—Wyatt, Gerber, Shoup, Scobey & Badie

[57] ABSTRACT

A connecting mechanism of an XY table is provided with a first table movable in one direction, a second table movable relative to the first table in a direction perpendicular thereto and having a guide rail parallel to the direction of movement of the first table, an auxiliary slide movable parallel to the direction of movement of the second table, a first support shaft fixed to the auxiliary slide, a second support shaft rotatably supported by the auxiliary slide and having an eccentric portion, a first antifriction bearing supported by the first support shaft, a second antifriction bearing supported by the eccentric portion of the second support shaft, and biasing means for biasing the second support shaft in a rotational direction. The guide rail is sandwiched between the first antifriction bearing and the second antifriction bearing biased in the direction of movement of the second table by the biasing means.

2 Claims, 4 Drawing Figures

CONNECTING MECHANISM OF AN XY TABLE

BACKGROUND OF THE INVENTION

1. Field of the Invention

This invention relates to an XY table which is movable in directions orthogonal to each other.

2. Description of the Prior Art

An XY table is known which has a table movable in one direction and also movable in a direction orthogonal to said one direction and in which an upper table movable in one direction is placed on a lower table movable in one direction so that the directions of movement of the upper and lower tables are orthogonal to each other. In such XY table, a driving motor for the lower table is fixed to a base bed and a motor for driving the upper table and a driving system such as a feed screw are assembled onto the lower table and therefore, the weight loaded onto the lower table becomes great and this has led to a disadvantage that quick stoppage or quick starting of the lower table is difficult due to great inertia.

As an XY table which eliminates such a disadvantage, there is known an XY table in which the driving motor for the upper table is fixed to the base bed similarly to the motor for the lower table.

In this XY table, a guide rail parallel to the direction of movement of the lower table is provided on the upper table, and a moving member movable in the direction of movement of the upper table by the upper table driving motor and the guide rail are slidably coupled together through an antifriction bearing, the upper table being movable in the direction of movement of the lower table by the lower table driving motor and also movable in the direction of movement of the upper table by the upper table driving motor.

In such XY table, the upper table driving motor is fixed to the base bed and therefore, unlike the conventional XY table, the load weight for the lower table can be made small and this is desirable where the table is operated at a high speed.

However, the conventional XY table in which the upper table driving motor is fixed to the base bed has been of such a construction that the coupling between the guide rail of the upper table and a member moved by the upper table driving motor is sandwiched by antifriction bearings respectively fitted to two support shafts fixed to said member and therefore, it has been impossible to adjust the pre-pressure of the antifriction bearings with respect to the guide rail to a predetermined level, and the fact that the support shafts are fixed has led to a disadvantage that pre-pressure leakage or back-lash of the antifriction bearings is liable to occur due to abrasion of the antifriction bearings or the guide rail.

Also, in the conventional coupling portion, the support shafts of the antifriction bearings have been supported in a cantilever fashion and this has led to a disadvantage that with a pre-pressure applied to the antifriction bearings, the support shafts are liable to be bent or damaged.

SUMMARY OF THE INVENTION

The present invention has been made to eliminate the above-noted disadvantages peculiar to the conventional XY table and an object thereof is to provide an XY table in which a proper pre-pressure can always be applied to antifriction bearings coupled to a guide rail and accuracy is not deteriorated even during a long-time use of the table.

Another object of the present invention is to provide coupling means in which the support shafts of the antifriction bearings coupled to the guide rail are supported in a non-cantilever fashion, thereby making the support shafts less liable to be damaged.

To achieve these objects, in the present invention, an eccentric shaft is fitted to a member moved by an upper table driving motor, antifriction bearings are fitted on the eccentric portion of such shaft, the eccentric shaft is rotatably biased by biasing means and the eccentric shaft is supported in a non-cantilever fashion.

The invention will become more fully apparent from the following detailed description thereof taken in conjunction with the accompanying drawings.

DESCRIPTION OF THE PREFERRED EMBODIMENT

Figure 1:
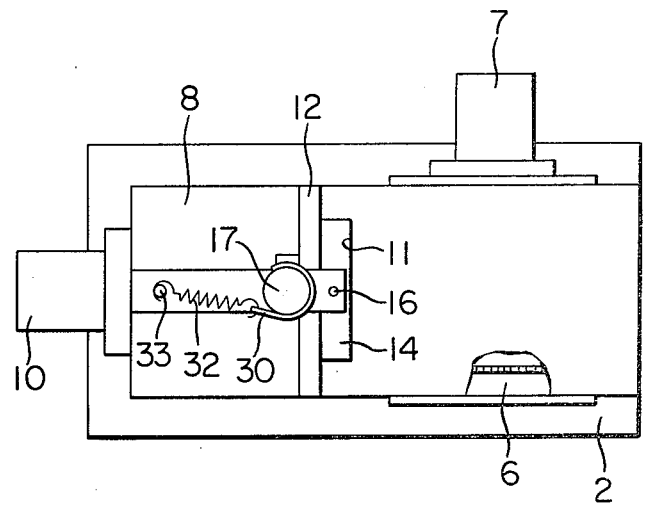
FIG. 1 is a top plan view of an XY table having a connecting mechanism according to the present invention.

An embodiment of the XY table according to the present invention will hereinafter be described with reference to the drawings.

A lower table 1 is supported for movement in a direction perpendicular to the lengthwise direction of a base bed 2 by a direct-acting guide 4 provided between the lower table 1 and a lower table body 3 fixed to the base bed 2.

An upper table 5 is supported for movement in the lengthwise direction of the base bed 2 relative to the lower table 1 by a direct-acting guide 6 provided between the upper table 5 and the lower table 1.

A lower table driving motor 7 fixed to the lower table body 3 is for moving the lower table 1 by a conventional feed screw device, not shown.

An auxiliary slide 8 is supported on an auxiliary slide body 9 fixed to the base bed 2 and is movable in the lengthwise direction of the base bed 2 by an upper table driving motor 10 fixed to an auxiliary slide body 9, with the aid of a conventional feed screw device, not shown.

The direction of movement of the auxiliary slide 8 is parallel to the direction of movement of the upper table 5.

The upper table 5 provided with a square cut-away 11 at one end thereof extends so as to overlap the auxiliary slide 8, a guide rail 12 having a guide surface parallel to the direction of movement of the lower table 1 is fixed to an end surface of the upper table 5 by a bolt 13, and a rectangular space 14 is formed in the end portion of the upper table 5.

The guide rail 12 enters into a fork-like portion 15 formed in the auxiliary slide 8. In the fork-like portion 15, a first support shaft 16 and a second support shaft 17 are fitted in vertical holes formed in the fork-like portion 15 so that they are located on the opposite sides of the guide rail 12.

Antifriction bearings 18 and 19 are fitted to the support shaft 16 and, by the guide rail 12 being sandwiched between these bearings, there is formed a connecting mechanism for the auxiliary slide 8 and the upper table 5.

Figure 3:
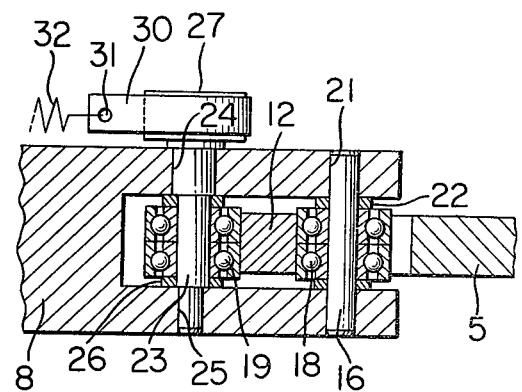
FIG. 3 is a partial longitudinal cross-sectional view of the connecting mechanism portion shown in FIGS. 1 and 2.

This connecting mechanism will be described in greater detail with reference to FIGS. 3 and 4.

The first support shaft 16 has its opposite ends fitted in a support shaft mounting bore 21 provided in the fork-like portion 15 of the auxiliary slide and is fixed against relative movement. On the intermediate portion of the first support shaft 16, two antifriction bearings 18 are fitted through an intermediate seat 22 in such a manner that they are sandwiched by the fork-like portion 15, and the antifriction bearings 18 are rotatable.

The second support shaft 17 is a stepped shaft having at the central portion thereof an eccentric portion 23 slightly eccentric with respect to the axis thereof. The amount of eccentricity is shown as δ in FIG. 4.

The shaft portions on the opposite sides of the eccentric portion 23 of the second support shaft are fitted in support shaft mounting holes 24 and 25 formed in the fork-like portion 15, and the second support shaft 17 is rotatably supported. On the eccentric portion 23 of the second support shaft, two antifriction bearings 19 are fitted through an intermediate seat 26 so that they are sandwiched by the fork-like portion 15, and the antifriction bearings 19 are rotatable.

A large-diametered disc member 27 is integrally secured to the upper end portion of the second support shaft 17. A steel belt 30 having one end thereof fixed by a stud 29 fixed by a bolt 28 is wound on the outer periphery of the disc member 27, and a spring securing hole 31 is formed in the other end portion of the steel belt 30.

Figure 2:
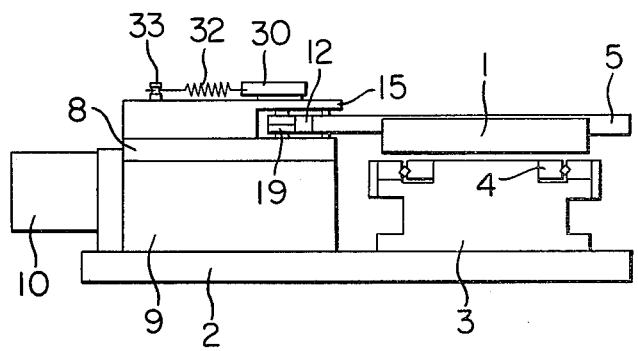
FIG. 2 is a front view of the FIG. 1 XY table.

A spring 32 having one hook-like portion thereof secured to the spring securing hole 31 has the other hook-like portion thereof secured to a pin 33 secured to the auxiliary slide, as shown in FIGS. 1 and 2, and imparts a tension force to the steel belt 30.

By imparting the tension force to the steel belt 30, there is formed a biasing means for biasing the second support shaft in a rotational direction.

Figure 4:
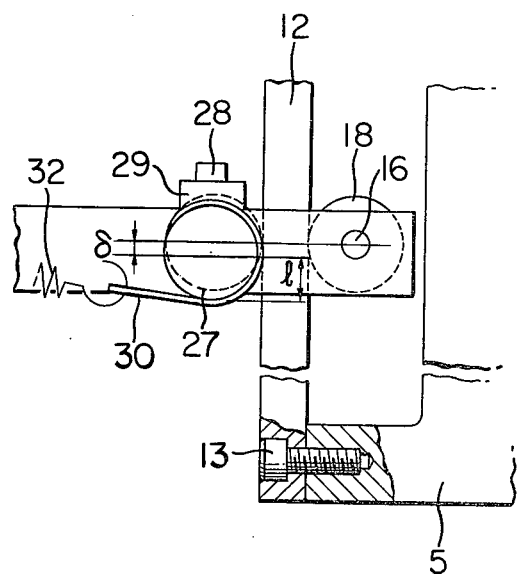
FIG. 4 is a top plan view of the FIG. 3 connecting mechanism portion.

By this biasing means, the guide rail 12 is sandwiched with a pressure force $1/\delta$ times as great as the tension force of the steel belt 30, where 1 is the radius of the disc member 27 as shown in FIG. 4.

Since δ is small as compared with 1, a sufficient pre-pressure can be provided by a relatively small spring.

Although, in this embodiment, the spring 30 has been shown as the means for biasing the second support shaft 17 in the rotational direction, use may also be made of other tension force generating means such as a hydraulic cylinder or the like.

In the XY table constructed as described above, the lower table 1 can be moved in a direction perpendicular to the lengthwise direction of the base bed 2 through a feed screw device by the drive of the lower table driving motor 7, and the upper table 5 placed on the lower table 1 is moved lengthwisely of the base bed 2 with the lower table 1.

At this time, the upper table 5 is coupled to the auxiliary slide 8 by the connecting mechanism, but since this connecting mechanism is coupled through the antifriction bearings 18 and 19 which rotatably bear against the guide rail 12 parallel to the direction of movement of the lower table 1, the movement of the upper table 5 with the lower table is not prevented by the connecting mechanism.

When the upper table driving motor 10 is driven and rotated, the auxiliary slide 8 is moved in a direction parallel to the direction of movement of the upper table 5 through a feed screw device, and the movement of the auxiliary slide 8 is transmitted to the upper table 5 through the connecting mechanism, whereby the upper table 5 is moved lengthwisely of the base bed 2.

In this manner, by rotating the lower table driving motor 7 or the upper table driving motor 10 by a predetermined amount, the upper table 5 can change its position to an arbitrary position on the orthogonal coordinates and thus, an XY table is constituted.

The connecting mechanism of the present invention is a mechanism which utilizes the eccentricity of the eccentric portion 23 provided on the second support shaft 17 to sandwich the guide rail 12 secured to the upper table 5 by means of the antifriction bearings 18 and 19 fitted on the first 16 and the second support shaft 17 having their opposite ends supported by the fork-like portion 15 provided in the auxiliary slide 8 and which biases the second support shaft 17 in the rotational direction by the biasing means and therefore, even if the guide rail 12 or the antifriction bearings 18, 19 are slightly abraded, the antifriction bearing 19 always presses the guide rail 12, so that no back-lash is created in the connecting mechanism portion and the pre-pressure forces of the antifriction bearings 18 and 19 remain substantially constant and invariable, and this leads to the effect that the positioning accuracy is not aggravated even during long-time use of the mechanism.

Also, the support shafts 16 and 17 are supported in non-cantilever fashion and therefore, there is no possibility of causing an accident that the support shafts flex or are damaged like the conventional support shafts supported in cantilever fashion.

Further, when an impact load acts on the upper table 5 and an excessive force acts on the support shaft 17, the support shaft 17 can effectively absorb such impact load because it is slightly rotatable and thus, the support shaft 17 can be protected from the danger of being damaged.

What I claim is:

1. A connecting mechanism of an XY table provided with a first table movable in one direction, a second table movable relative to said first table in a direction perpendicular thereto and having a guide rail parallel to the direction of movement of said first table, an auxiliary slide movable parallel to the direction of movement of said second table, a first support shaft fixed to said auxiliary slide, a second support shaft rotatably supported by said auxiliary slide and having an eccentric portion, a first antifriction bearing supported by said first support shaft, a second antifriction bearing supported by said eccentric portion of said second support shaft, and biasing means for biasing said second support shaft in a rotational direction, said guide rail being sandwiched between said first antifriction bearing and said second antifriction bearing biased in the direction of movement of said second table by said biasing means.

2. A connecting mechanism of an XY table according to claim 1, wherein said auxiliary slide has a fork-like portion at an end portion thereof, and said first and second support shafts are supported by said fork-like portion at their opposite ends thereof and support said first and second antifriction bearings at their intermediate portions, respectively.

* * * * *